INVENTOR
PAUL RAIBOURN
BY Howard J. Murray, Jr.
AGENT

June 24, 1958 P. RAIBOURN 2,840,633

COLOR TELEVISION RECEIVER

Filed Oct. 6, 1952 3 Sheets-Sheet 2

INVENTOR
PAUL RAIBOURN

BY Howard J. Murray, Jr.
AGENT

INVENTOR
PAUL RAIBOURN
BY Howard J. Murray Jr.
AGENT

United States Patent Office 2,840,633

Patented June 24, 1958

2,840,633

COLOR TELEVISION RECEIVER

Paul Raibourn, Southport, Conn.

Application October 6, 1952, Serial No. 313,251

4 Claims. (Cl. 178—5.4)

The present invention relates to color television image-reproducing systems. In one embodiment, it is directed to an arrangement in which the target area of a cathode ray tube is composed of a plurality of sets of phosphor strips, the width of each such set of strips corresponding generally to an elemental area of the polychrome image to be synthesized. It is recognized in the art that the individual strips constituting each set may be respectively representative of the component colors of the image, and, in the usual tricolor additive system, such colors may be red, green and blue, for example.

For various reasons, such as tube aging, temperature variations, or even changes in production tolerances, the line-scanning action of the electron beam of such a cathode ray tube may inherently be considerably non-linear with respect to time. More important, any such scanning non-linearities may be widely at variance with the deflection of the electron beam of the pick-up tube at the transmitter. Consequently, in many systems where the line-scanning action of the beam is transverse to the phosphor strips, the color being presented to an observer at any instant may not be identical with that represented by the incoming signal modulation, and, in extreme cases, may even be exactly opposite to that which should be displayed.

The above problem has been recognized and two solutions have heretofore been proposed. One of these includes the steps of modifying the line-scanning action of the beam by deriving a series of control pulses indicative of the rate of repetition of a single selected color-component reproduced at the tube target, generating a local signal indicative of an optimum rate of repetition of this selected color (the rate at which such component-color signals are received, for example) comparing these two signals to develop a control variation, and utilizing this control variation to accelerate or decelerate the scanning beam depending upon its direction of departure from such optimum rate. A system of this nature is shown, for example, in a co-pending application of E. O. Lawrence, S. N. 234,189, filed June 29, 1951, now Patent No. 2,744,952, granted May 8, 1956. It will be helpful in the following discussion to term such an arrangement one for synchronizing the beam-scanning operation with the rate at which component-color signals are received.

The other of the two solutions consists in allowing the scanning operation to remain non-linear, and then controlling the instants during which the received color signals are "gated" to the control electrode of the cathode ray tube. This gating operation need not be synchronized either with the rate of development of the component-color signals at the transmitter or with the rate at which they are received. Of course, some means are required for integrating, or "stretching out," these component-color signals so that they are available at the gating instants. Since the gating action is thus a function of the instantaneous position of the scanning beam, color misregistration is avoided. One such arrangement is suggested in Patent No. 2,545,325, issued March 13, 1951, to P. K. Weimer. The above system accordingly may be termed one for relating the instants of component-color signal application to instants when the scanning beam is impinging an area of the tube target corresponding to the same component-color.

In extremely broad terms, the first system set forth above is one in which the received signals control the beam action; the second, one in which the beam controls the utilization of the received signals.

In contrast to these arrangements, the present invention contemplates a color television system embodying a method of correlating the two functions (beam deflection and signal gating) so that neither acts as the controlling agency—instead, both are controlled in such a manner that asynchronous operation is impossible. This is brought about, in a preferred embodiment, by generating a local amplitude-modulated signal wave having a frequency nominally related to that at which a particular component-color representation is to be repeated in the polychrome display. This locally-developed variation then performs two functions—firstly, it is utilized in the deflection circuits of the tube to cause the scanning beam successively to impinge upon the component-color areas of the target at a rate which is a function of the frequency of the wave, and, secondly, it is employed to trigger, or gate, the respective component-color channels of the receiver to the control electrode of the cathode ray tube. Since these two operations are brought about by a single control, no lack of correspondence therebetween is possible during normal operation of the system.

One object of the present invention, therefore, is to provide an improved polychrome image-reproducing system in which color distortion or contamination resulting from incorrect color signal commutation is eliminated.

A further object of the invention is to provide a polychrome television receiver in which a single control effect is developed which simultaneously determines the instantaneous position of the electron scanning beam on the target electrode of the cathode ray tube, and also opens the particular component-color signal channel corresponding to the component-color of the image represented by the area of the target being impinged by the beam at such instant.

Other objects and advantages will be apparent from the following description of a preferred form of the invention and from the drawings, in which.

In the following description of a preferred form of the invention, reference will be made to its utilization with a particular type of cathode ray tube to which the invention seems to be especially suited. However, it will be immediately apparent that the concept is not restricted to use with such a tube, and that the two are only being combined for convenience of description and illustration. Actually, the fundamental principles of the invention are adaptable to many forms of color television tubes in which phosphors fluorescing in different component-colors are contiguously located and in which means are provided for deflecting the scanning beam of the tube in more than one direction.

Figure 1:
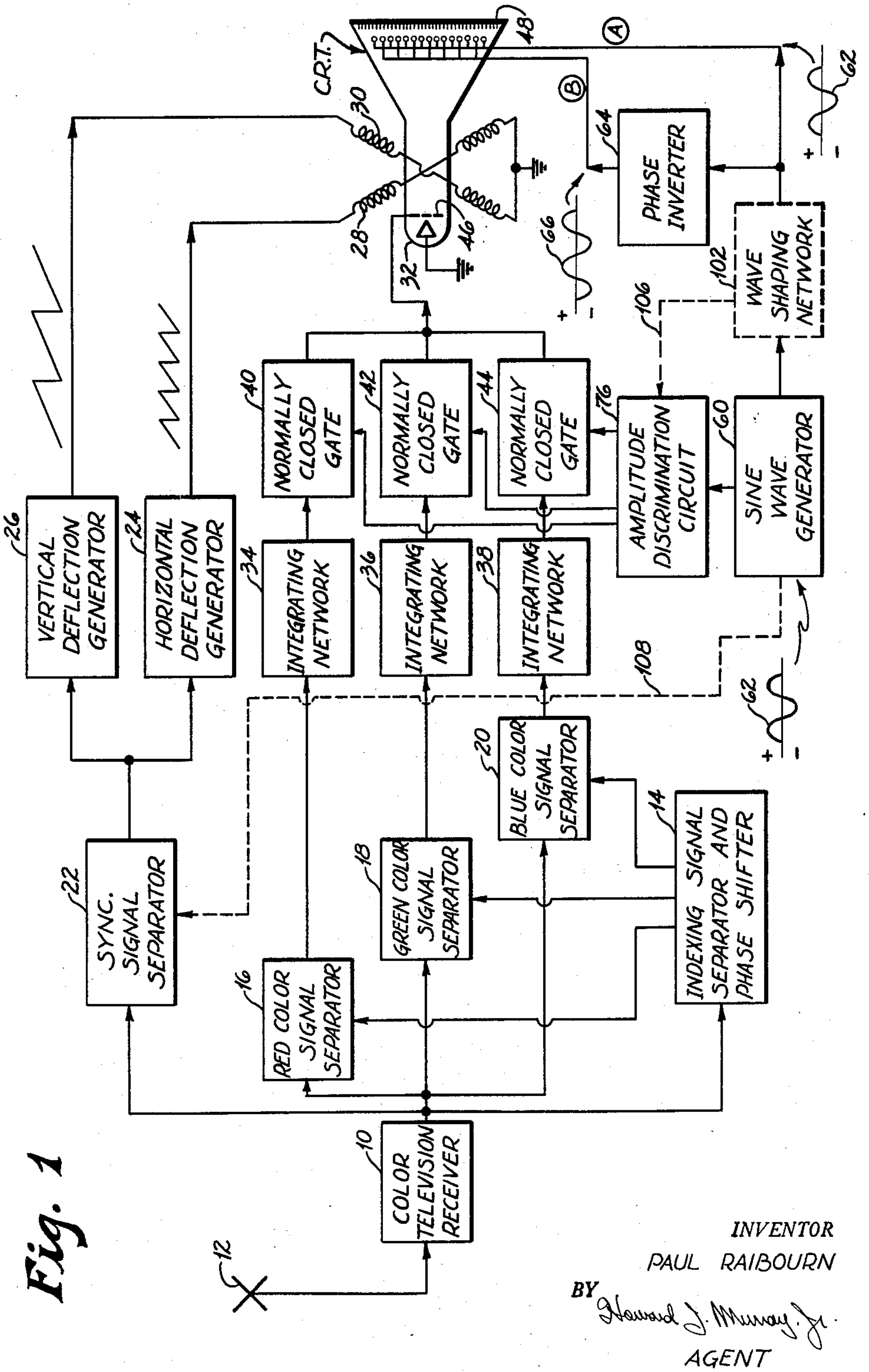
Fig. 1 is a block diagram of a preferred embodiment of the present invention.

Referring now to Fig. 1 of the drawings, there is illustrated a color television receiver identified by the reference numeral 10. This unit 10 includes conventional circuits which act to detect and amplify a composite-color television signal picked up by antenna 12. This composite-color signal may be of any type from which there can be derived separate signals indicative of different chromatic characteristics of the image to be synthesized. The particular form of composite signal which may be received by the system of Fig. 1 forms no part of the present invention, and, as a consequence, it follows that the particular circuit elements for separating out the individual component-color signals likewise may be of any known form. For simplicity of illustration, there has been shown an arrangement wherein a signal is received which incorporates sequentially-appearing chromaticity information together with indexing pulses which normally act to control the frequency and phasing of a local gating or sampling circuit. Such a sampling circuit is indicated at 14 in Fig. 1, its output being shifted in phase by 0°, 120°, and 240° sequentially to trigger the separators 16, 18, and 20 in the red, green and blue signal channels, respectively. It is repeated that this method is known in the art, as is the provision of a sync signal separator 22 for separating the horizontal and vertical synchronizing pulses from the composite signal in order to control the respective operation of the horizontal and vertical deflection generators 24 and 26. The output of the latter is applied to conventional deflecting coils 28 and 30 of a cathode ray tube 32.

Instead of the above arrangement, the respective component-color signals may be derived as set forth in the article "Recent Improvements in Band-Shared Simultaneous Color Television Systems," by B. D. Loughlin, appearing in the October 1951 issue of the Proceedings of the Institute of Radio Engineers. Signals transmitted by the so-called "field-sequential" method are also suitable for application to a receiving system operating in accordance with the principles of the present invention, as will later appear.

Assuming that three component-color signals have been separated into their individual channels, it is necessary that each intermittently-appearing component-color signal be "stretched-out" so as to form in effect such a signal as would be transmitted by a system of the so-called "simultaneous" type. This is accomplished by the integrating networks 34, 36 and 38, respectively, which may comprise low-pass filters of conventional design. Hence, the signal appearing in the output of each of the integrators 34, 36 and 38 is a continuously-present signal, the amplitude of which at any instant is representative of one particular chromaticity characteristic in the televised image. These signals are respectively applied to the normally-closed gates 40, 42 and 44, and the output of each such gate is connected directly to the control electrode 46 of the cathode ray tube 32.

Figure 2:
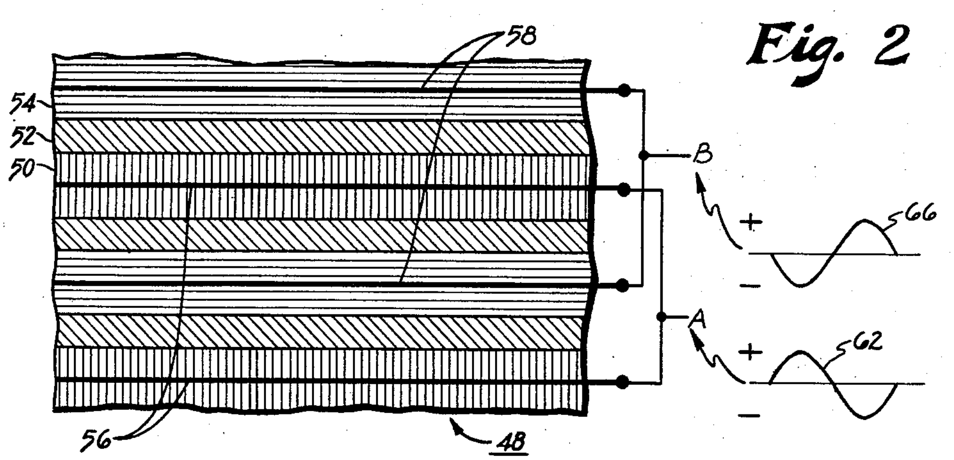
Figs. 2 and 3 are showings, idealized in part, of the manner in which color control may be effected by changes in grid potentials, this operation being in itself no part of the present invention.

Image-reproducing tube 32 may be conventional insofar as means are concerned for developing and deflecting (by passage of current through the coils 28 and 30) a single beam of electrons to scan in substantially mutually perpendicular directions an image raster area on the tube target electrode. The fluorescent screen 48 of the tube, however, is formed as a series of strips of differently-colored phosphor compounds. Alternatively, a white phosphor screen may be utilized in conjunction with color filter strip elements, as is well known in the art. These strips are preferably arranged in cyclically-repeating sets of three, each set containing strips respectively representative of each of the primary colors red, green and blue. One preferred arrangement of the strips is shown in Fig. 2 as 50, 52 and 54, although other relationships are possible. A coating of aluminum or other electrically-conductive material is then applied to the phosphor in a manner known in the art.

Figure 3:
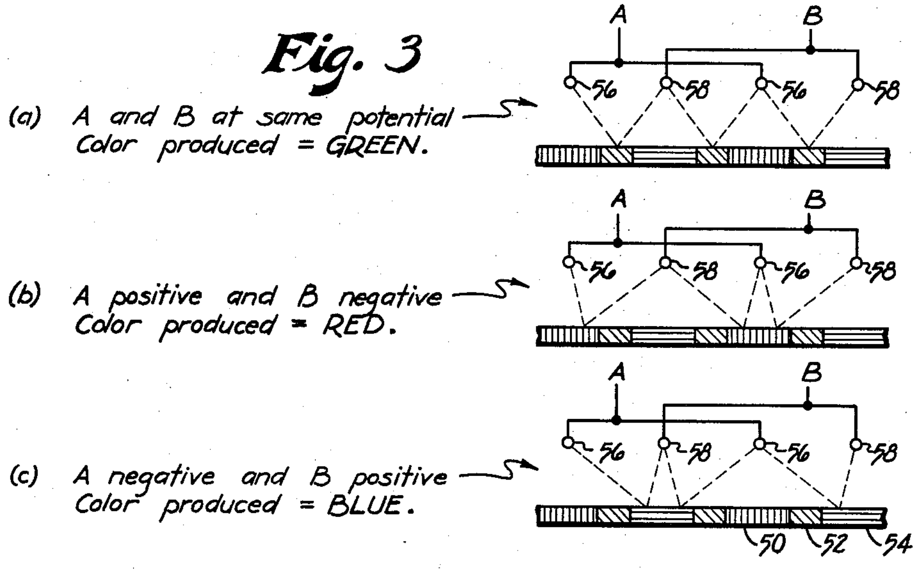

A grid composed of parallel coplanar wires lies adjacent to but spaced apart from the screen 48 as shown in Figs. 1, 2, and 3. The wires extend longitudinally of the strips and parallel to one edge thereof in such a manner that one complete set of strips is subtended by adjacent wires. A cathode ray tube of this design is now known in the art as the "Lawrence" tube, and is fully described in a co-pending patent application of Ernest O. Lawrence, S. N. 219,213 filed April 4, 1951, now Pat. No. 2,692,532, granted Oct. 26, 1954. The above-mentioned wire grid may actually be considered as two electrically-separate grids, since alternate wires 56 (Fig. 2) are connected to a common conductor A, and alternate wires 58 to a second common conductor B. As described in the above Lawrence application, the wires 56 and 58 may have a normally constant potential applied thereto which is different from the potential applied to the conductive coating on the phosphor strips 50, 52 and 54. This action forms a plurality of electron lenses which tend to produce an electron-optical effect such that the beam is caused to converge into a series of parallel lines in a manner shown idealized in Fig. 3(*a*). In the embodiment shown, a uniform potential applied to both conductors A and B will, if this potential is properly related to that of the aluminized screen, result in the presentation of a green image to an observer.

If, however, the conductor A is made sufficiently positive relative to conductor B, the beam electrons will follow paths such that they will impinge only on the red strips, as shown in Figure 3(*b*). Likewise, if B is positive by a proper amount relative to A, the beam will follow the idealized path of Figure 3(*c*), and blue will result. All of this operation is described in detail in the Lawrence application referred to, and since it does not in itself form a part of the present invention, no further discussion is believed necessary. It need only be recognized that changes in the color presented by the cathode-ray tube are functions of the frequency at which potential changes occur between wires 56 and 58.

In order to effect these potential changes, a generator 60 is provided, the output of which may have the waveform identified by the reference numeral 62. This wave is applied directly to the grid wires 56 over conductor A, and to the grid wires 58 over conductor B. However, a phase invertor 64 is provided between the generator 60 and the cathode ray tube 32, so that the wave reaching the wires 58 over conductor B has the form 66.

It will now be seen that when the sine wave 62 is of zero amplitude, the condition of Figure 3(*a*) will prevail. When the wave 62 is at its crest, then wave 66 is at its trough, and A is positive while B is negative. Consequently, the condition of Fig. 3(*b*) exists. In the same manner, when wave 62 is at its lowest point (most negative), wave 66 is at its peak, and the condition of Fig. 3(*c*) is brought about.

Figure 4:
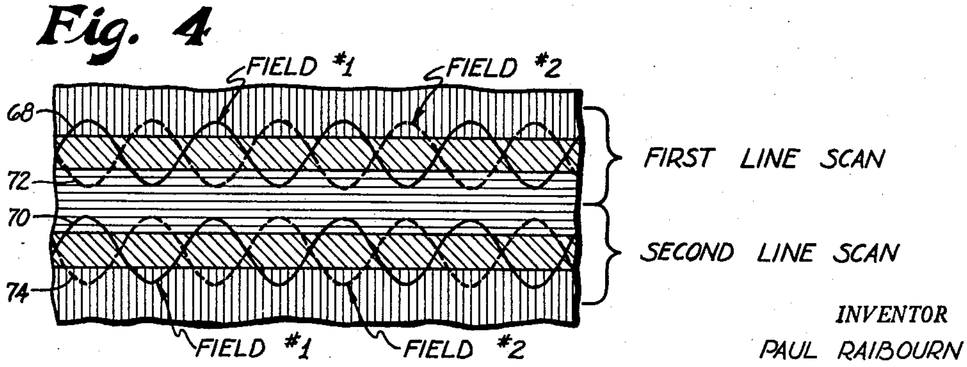
Fig. 4 is an illustration of a section of a cathode ray tube target electrode, showing one possible path that may be followed by the electron beam in successive field-scanning operations.

The resulting action of the electron beam is shown in Fig. 4. In field 1, each color triplet is scanned over a path such as 68, so that the sequence of color presentation may be blue, green, red, green, blue, green, red, and so forth. If the frequency of the generator 60 is chosen to be an odd multiple of one-half of the line-scanning frequency, when the sequence of color presentation in line #2 will be red, green, blue, green, red, green, blue and so forth, following the path 70. If the frequency of wave 62 is also properly related to the field frequency, then the scanning path 68 will be reversed in field #2, as shown by 72, while path 70 will now be as indicated at 74.

In accordance with a principal feature of the present invention, means are provided for definitely relating the color changes (as described above in connection with Figs. 2, 3 and 4) to the instants at which the control electrode 46 of tube 32 is "gated," or connected, to the respective chromaticity signals as they appear in the outputs of the integrating networks 34, 36 and 38. These coordinating means include as a principal component the amplitude-discrimination circuit 76. This circuit 76 supplies positive voltage pulses to the normally-closed gates 40, 42 and 44 according to the instantaneous amplitude of the sine wave 62 from generator 60.

Figure 5:
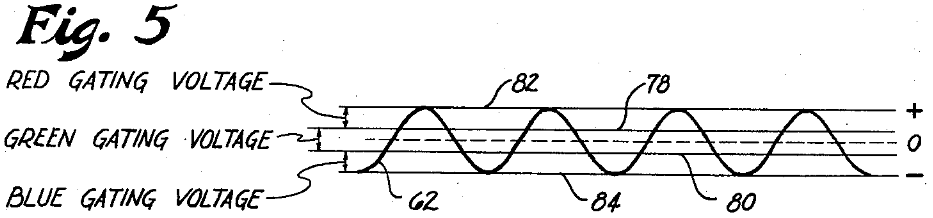
Fig. 5 is a graph illustrating how the output of the sine-wave generator of Fig. 1 may act as a gating voltage.

Referring to Fig. 5, when the wave 62 is of low amplitude (between the levels 78 and 80, for example) a pulse is supplied to gate 42 to open the latter and connect the green component color signal from network 36 to the grid 46 of cathode ray tube 32. When the wave 62 is positive between the limits 78 and 82, a pulse is similarly supplied to the red gate 40. Between the limits 80 and 84 of the sine wave, the blue gate 44 is operated.

Figure 6:
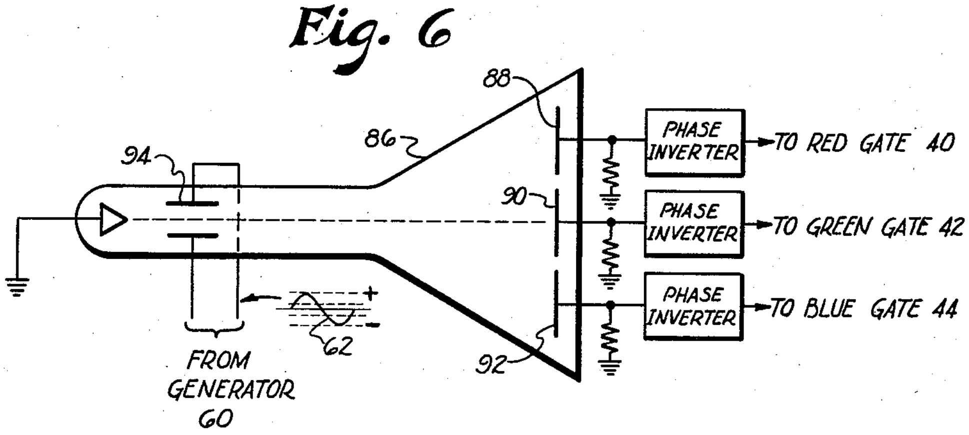
Figs. 6 and 7 illustrate circuits that may be used, if desired, in the corresponding blocks of Fig. 1.

The above operation may be performed by several known circuits, one of which is illustrated in Fig. 6. It consists of a cathode ray tube 86 having three vertically-displaced target electrodes 88, 90 and 92, so that the scanning beam need only be deflected vertically (in the drawing). When the sine wave 62 applied to the single pair of deflecting plates 94 is of low amplitude (either positive or negative), the beam impinges electrode 90 and develops a pulse which is inverted and applied to the green gate 42. When wave 62 is of high positive polarity (see Fig. 5) the cathode ray beam is caused to impinge electrode 88, and send a pulse to open red gate 40. Similarly, blue gate 44 is opened when the electron beam of cathode ray tube 86 impinges the electrode 92.

Figure 7:
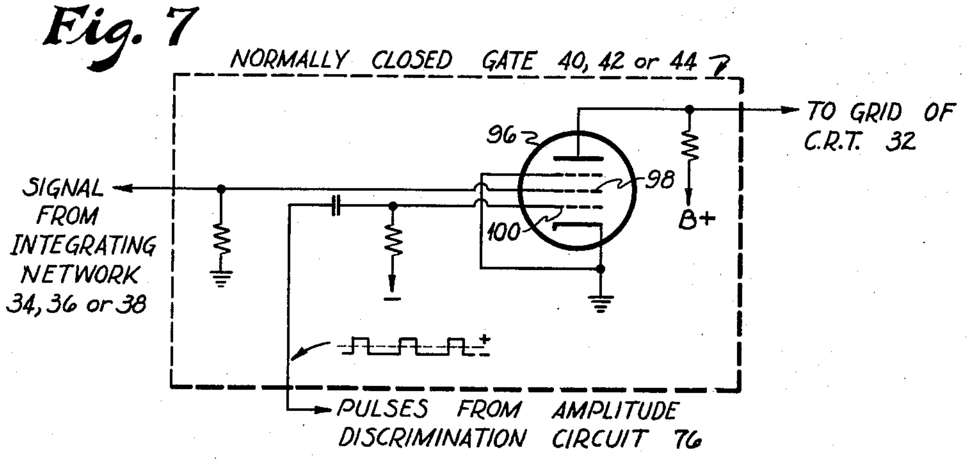

Many circuits are also known which will perform the functions of the gates 40, 42 and 44. One is illustrated in Fig. 7, and consists of a multi-grid tube 96 to one electrode 98 of which is continuously applied a component-color signal from one of the networks 34, 36 or 38. However, tube 96 is normally biased to cutoff, and is only opened by application to its other control electrode 100 of one of the positive pulses from the amplitude-discrimination circuit 76. The latter opens the tube for the duration of the pulse, and permits passage of the particular component-color signal to the grid 46 of the cathode ray tube 32.

Figure 8:
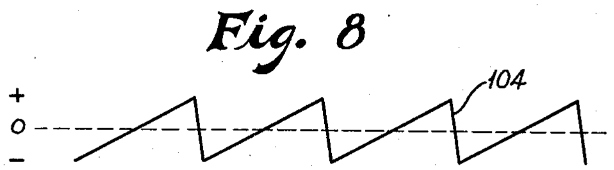
Fig. 8 illustrates how the output of the wave generator of Fig. 1 may be utilized in another form, such, for example, as a sawtooth wave.

It is not necessary that the sine wave output of the generator 60 be utilized in that form. If desired, it may be applied to a conventional wave-shaping network 102 illustrated in broken lines in Fig. 1. This network 102 may change the shape of the wave 62 to a sawtooth wave, for example, such as shown by the reference numeral 104 in Fig. 8. This wave 104 would be applied to conductors A and B of Fig. 1 in the usual manner, and also to the amplitude-discrimination circuit 76 over conductor 106. The direct connection between the generator 60 and the amplitude-discrimination circuit 76 would then be omitted.

In order periodically to correlate the operation of the generator 60 with the frequency at which the color information is received, horizontal synchronizing pulses from the sync separator 22 may be applied to the generator 60 over the conductor 108. In such an event, the generator 60 would only be "triggered" at the end of each line-scanning interval, but it should hold to it frequency between such times. If necessary, a frequency-multiplier may be inserted in the lead 108 to provide as precise a synchronization of generator 60 as may be necessary.

It will thus be apparent that, by means of the present invention, no color distortion is possible under normal operating conditions. If the frequency of the generator 60 should drift slightly with respect to the horizontal scanning rate, then a small amount of geometric distortion may appear, but, since a majority of the television receivers manufactured within presently-acceptable production tolerances are non-linear in varying degrees, such a geometric deviation will be generally unnoticeable.

If a signal of the simultaneous type is received, then the various component-color portions thereof may be applied directly to the gates 40, 42 and 44. The indexing signal separator 14, the color signal separators 16, 18 and 20, and the integrators 34, 36 and 38 would of course be omitted.

While the invention has been illustratively described above in conjunction with a line-scanning action by the cathode-ray beam which is in a direction parallel to the axes of the phosphor strips, it will be recognized that in a broader sense the concept is directed to any other method of scanning the target electrode such, for example, as transversely to the strip axes. Furthermore, instead of the phosphors being laid down in strip form, they may be arranged as discrete component-color areas of many different possible configurations, with the shape and space disposition of the grid wires being modified accordingly. Generically, then, a control variation acting in the vicinity of the target electrode is utilized to effect a color change independently of the normal beam scanning action, and this same control variation is employed to open the respective component-color signal channels in exact synchronism and phase with such color changing.

Having thus described my invention, I claim:

1. A polychrome television receiver incorporating an image-reproducing tube having a target electrode formed of a series of parallel phosphor strips arranged side-by-side in regularly-repeating sets, each set containing strips respectively fluorescing in several selected component colors, said image-reproducing tube also including means for developing a scanning beam and for deflecting said beam in a line-scanning direction parallel to said phosphor strips, means forming part of said receiver for detecting and amplifying a composite-color television signal in which information concerning the several component colors is sequentially and cyclically made available at a predetermined rate, means for separating the said several component-colors into separate channels each respectively representative of a single component color, means for integrating the component-color signal in each said channel so that it is continuously available during normal operation of the receiver, a circuit for generating a control variation having a frequency determined in accordance with the desired rate at which different component colors of said image are presented to an observer, means for applying said control variation to said image-reproducing tube so as to modify the said line-scanning deflection of said scanning beam in a direction substantially perpendicular to the direction of said line scanning and to the longitudinal axes of said phosphor strips so that said beam normally impinges on each component-color strip of a particular set in a predetermined sequence during each line-scanning operation, and further means including an amplitude discrimination circuit for effectively applying said control variation to each of said component-color channels so as sequentially to regulate the passage of component-color signals therethrough in accordance with the instantaneous position of the said scanning beam relative to the phosphor strips of each said set.

2. A polychrome television receiver according to claim 1, in which said image-reproducing tube is provided with a grid of coplanar wires arranged parallel both to each other and to the said phosphor strips, said grid being adjacent to but spaced apart from said target electrode, the said control variation being selectively applied to the wires of said grid so as to modify the line-scanning deflection of said scanning beam.

3. Signal receiving apparatus of the class described, comprising: a receiving device capable of a plurality of different and individually controllable responses to said received signal, said signal including information occupying separate sequential intervals for determining the individual magnitude of each of said responses; selecting means connected to said receiving device and enabling a single one of said responses to be controlled individually and exclusively by said signal; a local oscillator controlling the operation of said selecting means; means controlled by said oscillator synchronously with respect to said selecting means for applying said magnitude determining information to said receiving device, and a plurality of storage means for individually retaining said magnitude determining information of said signal for each of said responses so that the information for the different responses occupies overlapping intervals, said selecting means being connected intermediate said storage means and said receiving means.

4. Signal receiving apparatus of the class described, for receiving a color television signal and reproducing a polychrome image in accordance therewith, said signal containing information for determining a varying individual luminance for each of a plurality of component colors of said image, said apparatus comprising: an image-reproducing means including a plurality of contiguous groups of display areas, each group containing an individual display area for producing a display of each of said component colors, said individual areas being disposed in close proximity to each other and each including a fluorescent surface activatable to cause display of its indivdual color in response to the impingement of an electron beam thereon; means for generating said beam and producing scanning action thereof over said groups; diverting means associated with each group for causing said beam to impinge on a single one of the individual areas thereof; selective means for selecting the luminance information and sequentially controlling the intensity of said beam in accordance with the variations of said luminance information of each color component; means for generating a local oscillation; and circuit means for simultaneously applying said local oscillation to said diverting means and to said selective means, whereby operation of said diverting means and said selective means is synchronized, a plurality of integrating means connected to said selective means for individually stretching out said luminance information of said signal, and signal separating means for individually applying said luminance information to said integrating means.

References Cited in the file of this patent

UNITED STATES PATENTS

| | | |
|---|---|---|
| 2,595,548 | Schroeder | May 6, 1952 |
| 2,615,976 | Rose | Oct. 28, 1952 |
| 2,626,323 | Sziklai | Jan. 20, 1953 |
| 2,634,327 | Sziklai | Apr. 7, 1953 |
| 2,704,783 | Sziklai | Mar. 22, 1955 |
| 2,705,257 | Lawrence | Mar. 29, 1955 |
| 2,725,418 | Sziklai | Nov. 29, 1955 |

OTHER REFERENCES

"Electronics" magazine for February 1952, pages 88–97.